United States Patent [19]

Billmers et al.

[11] Patent Number: 5,360,845

[45] Date of Patent: Nov. 1, 1994

[54] STARCH ESTER BASED HOT MELT ADHESIVE

[75] Inventors: Robert J. Billmers, Stockton; Charles W. Paul, Madison; Stephen F. Hatfield, Somerville, all of N.J.; Thomas F. Kauffman, Easton, Pa.

[73] Assignee: National Starch and Chemical Investment Holding Corporation, Wilmington, Del.

[21] Appl. No.: 106,023

[22] Filed: Aug. 13, 1993

Related U.S. Application Data

[63] Continuation-in-part of Ser. No. 995,493, Dec. 23, 1992, abandoned.

[51] Int. Cl.$^5$ ............................................. C08L 3/06
[52] U.S. Cl. ................................. 524/51; 524/47; 524/48; 524/52; 524/53; 106/210; 106/211; 106/212; 106/214
[58] Field of Search .................. 524/47, 48, 51, 52, 524/53; 106/210, 211, 212, 214

[56] References Cited

U.S. PATENT DOCUMENTS

| | | | |
|---|---|---|---|
| 3,719,514 | 3/1973 | Taylor | 524/51 |
| 4,131,581 | 12/1978 | Coker | 260/29.1 R |
| 4,396,529 | 8/1983 | Price et al. | 252/307 |
| 4,711,794 | 12/1987 | Gosset et al. | 524/47 |
| 4,913,969 | 4/1990 | Schulte et al. | 428/420 |
| 5,158,810 | 10/1992 | Oishi et al. | 524/52 |
| 5,182,252 | 1/1993 | Nagasawa et al. | 428/421 |

FOREIGN PATENT DOCUMENTS

| | | |
|---|---|---|
| 511916A1 | 11/1992 | European Pat. Off. |
| WO92/19690 | 11/1992 | WIPO |
| WO92/22606 | 12/1992 | WIPO |

*Primary Examiner*—Peter Szekely
*Attorney, Agent, or Firm*—Eugene Zagarella, Jr.

[57] ABSTRACT

Hot melt adhesive compositions comprising selected modified starch esters as the main or base adhesive material wherein the starch ester has an ester component of about 2 to 18 carbon atoms and a DS of from about 0.3 to 3.0 and a sufficient amount of a non-volatile, polar organic diluent to allow the composition to melt and have a viscosity of less than 50,000 cP at an application temperature of 400° F. or less.

36 Claims, No Drawings

STARCH ESTER BASED HOT MELT ADHESIVE

This application is a continuation-in-part of application Ser. No. 07/995,493 filed Dec. 23, 1992, now abandoned.

BACKGROUND OF THE INVENTION

This invention relates to hot melt adhesive compositions wherein the base or main adhesive material is a modified intermediate or high DS starch ester.

Hot melt adhesives are 100% solid materials which do not contain or require any volatile solvents. They are solid materials at room temperature, but, on the application of heat, melt to a liquid or fluid state in which form they are applied to a substrate. On cooling, the adhesive regains its solid form and gains its cohesive strength. In this regard, hot melt adhesives differ from other types of adhesives which achieve the solid state through evaporation or removal of solvents or by polymerization.

The major advantage of hot melt adhesives is the lack of a carrier fluid which eliminates the need for drying the adhesive film once it is applied to the substrate. This elimination of the drying step overcomes hazards associated with solvent usage and also allows for faster production line speeds and lower costs. The ability to modify the properties of the adhesive composition with the addition of various resins, oils, waxes and other additives, makes hot melt adhesives commercially useful in a wide variety of applications.

Historically, hot melt adhesives have been based on synthetic and natural resins and waxes, particularly petroleum derived polymers such as polyethylene, ethylene-vinyl acetate, styrenic block copolymers, and polypropylene to name a few. These compositions are further tackified, plasticized, and reinforced with a variety of resins, oils and waxes which are derived from both petroleum and naturally occurring feedstocks such as wood, gum and tall oil rosin and terpenes. However, such compositions suffer from the cyclical price changes common to all oil derived materials, and also are generally very resistant to degradation once the articles employing them are disposed of.

Starches have been used as adhesives in aqueous systems for many years. In such systems, water which is needed for application of the adhesive is removed by drying or other means after the application to the substrate leaving the adhesive bond or film. Starch has also been used in hot melts but typically as a filler or extender as disclosed in U.S. Pat. No. 4,131,581 issued Dec. 26, 1978 to J. N. Coker. In another type application, starch has been used in hot melts as a pre-applied activator material which releases moisture into the subsequently applied hot melt, see U.S. Pat. No. 4,913,969 issued Apr. 3, 1990 to H. Schulte, et al. Dextrin glues are applied from water by means of heating solutions of the glue in water at temperature and pressure above atmospheric and applying a foam of this material as disclosed in U.S. Pat. No. 4,396,529 issued Aug. 2, 1983 to R. Price, et al.

The present invention stems from the growing movement away from petroleum derived raw materials to those derived from natural resources and as part of an effort to utilize raw materials which have demonstrated some level of degradation. Despite the use of starch in different adhesive applications, there still exists the need for a natural based starch material which can be used in hot melts as the base or main functional adhesive material and which is compatible with the other various components typically found in hot melt formulations. This has not been easy to accomplish since starch will normally not melt in the absence of water or solvent and it has been difficult to formulate a hot melt composition containing starch as the primary or base adhesive material.

SUMMARY OF THE INVENTION

Now it has been found that selected modified starch esters are useful as the prime functional or base polymer adhesive in hot melt formulations, do not require water to melt and perform in hot melts, and provide good compatibility with diluents and other components. Besides imparting a high degree of biodegradability to the system, the modified starch provides a renewable raw material and greatly increases the water dispersibility of these adhesive formulations.

More particularly, this invention is directed to a hot melt adhesive composition comprising from about 10 to 80% by weight of an intermediate or high DS starch ester having from about 2 to 18 carbon atoms in the ester component and a DS (degree of substitution) of from about 0.3 to 3.0 and from about 20 to 90% by weight of a non-volatile organic diluent.

DETAILED DESCRIPTION OF THE INVENTION

The main or primary constituent of the hot melt adhesive composition of this invention is a modified starch ester. The modified starch which can be used is an esterified starch compound having the formula:

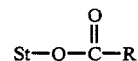

where St represents the starch base material and R is an alkyl, aryl, alkenyl, alkaryl or aralkyl of 1 to 17, preferably 1 to 6 carbon atoms. More preferably, the ester compound will contain an R group which is an alkyl of 1 to 2 carbon atoms. Starch esters of this type include starch acetate, starch propionate, starch butyrate, starch hexanoate, starch stearate, starch oleate, starch benzoate, blends of two more of these esters, for example starch acetate/starch propionate and mixed starch esters where the starch contains two or more different ester substituents, e.g., starch acetate/propionate, i.e., the ester having the formula such as:

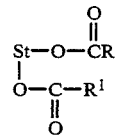

where R and $R^1$ represent different substituent groups as defined above.

Additionally, the modified starch ester will have a DS (degree of substitution) of from about 0.3 to 3.0, preferably from about 0.7 to 2.4, and more preferably from about 0.8 to 1.5. The term "degree of substitution" (DS) as used herein indicates the average number of sites per anhydroglucose unit of the starch molecule on which there are substituent groups.

The starch esters which are used in this invention are prepared from the respective carboxylic acid anhydride or acid chlorides. Typical methods include reactions in aqueous systems as disclosed in U.S. Pat. No. 2,461,139 issued Feb. 8, 1949 to C. Caldwell and in solvent systems such as pyridine. These and other methods are disclosed in "Modified Starches: Properties and Uses", edited by O. B. Wurzburg, Chapter 4, pp. 55–77, 1986 and "Starch: Chemistry and Technology", edited by R. L. Whistler, et al., Chapter X, pp. 332–343, 1984. While the different starch esters having varied DS levels can be prepared using one or more of the known methods, the preferred intermediate DS levels of about 0.3 to 2.0 have not heretofore been readily available. An improved method for preparing these intermediate DS starch esters using an aqueous system is disclosed in Example 1.

The base starch material used in the modified starch esters of this invention and the preparation thereof, may be any of several starches, native, converted or derivatized. Such starches include those derived from any plant source including corn, potato, wheat, rice, sago, tapioca, waxy maize, sorghum and high amylose starch such as high amylose corn, i.e., starch having at least 45% and more particularly at least 65% amylose content by weight, etc. Starch flours may also be used. Also included are the conversion products derived from any of the former bases, such as, for example, dextrins prepared by hydrolytic action of acid and/or heat; fluidity or thin boiling starches prepared by enzyme conversions or mild acid hydrolysis; oxidized starches prepared by treatment with oxidants such as sodium hypochlorite; and derivatized starches, such as, cationic, anionic, amphoteric, non-ionic, and crosslinked. While any of these starches may be used, the high amylose starches and particularly those having amylose content of at least 65% by weight are preferred. Although the full molecular weight or unhydrolyzed starches can be used as the base material, particularly useful are those starches which have been hydrolyzed but not severely degraded. Such starches have a dextrose equivalent (DE) of less than about 10 and preferably less than about 5. Dextrose equivalent (DE) is defined as the reducing power of the hydrolyzate. Each starch molecule has one reducing end, therefore DE is inversely related to molecular weight. The DE of anhydrous D-glucose is defined as 100 and the DE of unhydrolyzed starch is virtually zero.

In addition to the ester component, it is necessary to include a diluent in the hot melt adhesive formulation. The diluent is a non-volatile organic material which is compatible with the modified starch ester and will be present in sufficient amount to allow the formulation to function as a hot melt by melting and forming a homogeneous melt at the application temperature and having a suitable viscosity at that temperature. This means the use of diluent will allow the formulation to melt at the application temperature, i.e., 400° F. (204° C.) or less, and also possess the desired viscosity of <50,000 cP at that temperature. A variety of materials can be used as a diluent in combination with the selected modified esters to satisfy the desired conditions. More particularly, the diluent will be an organic material which is non-volatile and compatible with the starch ester and is characterized in containing one or more polar groups, i.e., it is not an all hydrocarbon material. Typically it will have a molecular weight of 5,000 or less. Useful diluents containing polar groups include sulfonamides, carboxylic acids and esters, carboxylate salts, amides, phosphate esters, alcohols, i.e. hydroxy containing compounds, epoxides, sulfones, ethers, imides, amines, carbonates, ureas and urethanes. Preferred diluents are those containing sulfonamide, alcohol, amide and ester groups. The following compounds illustrate diluents which may be used: N-ethyl-o,(and/or p)-toluene sulfonamide, N-(2-hydroxypropyl) benzene sulfonamide, diethyl citrate, adipic acid, ricinoleic acid, triethylcitrate, diethyl phthalate, dibutoxy ethyl phthalate, butyl benzylphthalate, dimethyl adipate, diethylene glycol dibenzoate, sodium ricinoleate, sodium salts of rosins, N-(2-hydroxyethyl)-12-hydroxy stearamide, N-octyl pyrrolidone, 2-ethylhexyl diphenyl phosphate, tricresylphosphate, ethoxylates of phenol and bisphenol A, glycerin, sorbitol, polyglycerin, glycerin monoricinoleate, sorbitol mono-stearate, epoxidized oils such as soybean oil, tetramethylene sulfone, poly(ethylene glycol), N-butyl succinimide, poly(ethylene imine), triethanol amine, ethylene carbonate, propylene carbonate, urea, 1,3-dimethyl urea, 1,1-dimethyl-3-phenyl urea and polyurethanes [based on reaction of polyols with di-isocyanates such as poly(propylene glycol) with methylene-bis(4-phenyl isocyanate)].

The diluents as described above include a number of materials containing polar groups and may include plasticizers and waxes containing such polar functional groups. The preferred diluents include those containing sulfonamide, alcohol, amide and ester groups which absorb low levels of moisture at high humidity, i.e., have a moisture content of less than about 20%, preferably less than about 15% by weight, at 90% relative humidity (RH) and 23° C. Particularly preferred diluents are the alcohols or hydroxy containing compounds having this characteristic of low moisture absorption, i.e., hydrophobic alcohols and especially the ethoxylates of phenol and bisphenol A, and N-(2-hydroxyethyl)-12-hydroxy stearamide. The preferred diluents do not include the hydrophilic type alcohols such as glycerin or sorbitol and other compounds of this type which are hygroscopic and easily pick up and absorb moisture.

The major functional component of the adhesive, i.e., the modified starch ester, will be present in an amount of from about 10 to 80% by weight, preferably about 20 to 60% based on the total weight of the composition. The actual amount will vary depending on the type of ester modification, the amount or degree of substitution (DS) and the nature of the base starch. The end use application as well as the type and amount of other components will also be a factor in determining the amount of modified starch ester that is used.

The amount of diluent will vary from about 20 to 90% by weight of the adhesive composition and preferably from about 25 to 75%, based on the weight of the composition.

Optional components in the adhesive composition may include compatible polymers such as hydrophilic polymers or hydrophobic thermoplastic polymers, tackifiers and antioxidants.

The optional polymers may comprise up to about 35% by weight of the composition and include hydrophilic polymers such as water-soluble and/or water-swellable polymers and hydrophobic thermoplastic water-insoluble polymers. Such polymers include celluloses such as alkylcelluloses, hydroxyalkyl-celluloses, cellulose esters and cellulose salts, polyvinyl alcohols prepared by partial to essentially complete hydrolysis of polyvinyl acetate (preferably 45–80% hydrolyzed), synthetic polymers such as poly(acrylic acids) and their salts and esters, poly(acrylamides), poly(vinyl acetates), poly(vinyl acetate phthlates), poly(vinyl pyrrolidone), poly(crotonic acids), polyolefins such as polyethylene and polypropylene, vinylpolymers such as polyvinylacetates, polystyrene, polyacrylonitriles, polyvinylcarbazoles, polyacetals, polycondensates such as polyamides, thermoplastic polyesters such as polyhydroxybutyrate/hydroxyvalerate, polylactides (i.e., esters of lactic acid), polycarbonates, polyurethanes, poly(alkylene terephthalates), polyarylethers, poly(ethyl oxazoline), poly(ethylene imine), poly(ethylene glycol), thermoplastic polyimides, poly(alkylene oxides) such as polymers of ethylene oxide and propylene oxide, and gelatin.

Also included as optional polymers are thermoplastic copolymers such as ethylene/vinyl acetate, ethylene/vinyl alcohol, ethylene/acrylic acid, ethylene/ethylacrylate, and styrene/acrylonitrile.

Particularly useful are polymers containing polar groups such as those described earlier for the diluent with those containing hydroxyl groups being most preferred, especially polyvinyl alcohol, ethylene/vinyl alcohol and hydroxypropyl cellulose.

The adhesive compositions may also include tackifier resins in amounts of up to 70% by weight, based on the weight of the composition. The tackifying resins useful in the adhesive compositions are generally polar in nature and have a Ring and Ball softening point (as described by ASTM E-26) of greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such, for example, as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) phenolic modified terpene resins and hydrogenated derivatives thereof such, for example, as the resin product resulting from the condensation, in an acidic medium, of a bicyclic terpene and a phenol; (4) thermoplastic alkyl phenolic resins such as those described in U.S. Pat. Nos. 4,073,776 and 4,023,826. Mixtures of two or more of the above described tackifying resins, as well as blends of the above resins with small amounts of (e.g., less than about 10% of the adhesive) less compatible resins may be utilized for some formulations.

An antioxidant or stabilizer may also be included in the adhesive compositions described herein in amounts of up to about 3% by weight. Among the applicable antioxidants or stabilizers are high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; pentaerythritol tetrakis-3(3,5-di-tert-butyl-4-hydroxyphenyl)-propionate; n-octadecyl-3,5-di-tert-butyl-4-hydroxyphenol)-propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n-octyl-thio)-1,3,5-triazine; di-n-octadecyl 3,5-di-tert-butyl-4-hydroxybenzylphosphonate; 2-(n-octylthio)-ethyl 3,5-di-tert-butyl-4-hydroxy-benzoate; and sorbitol hexa[3-(3,5-di-tert-butyl-4-hydroxyphenyl)-propionate].

Other additives conventionally used in hot melt adhesives to satisfy different properties and meet specific application requirements also may be added to the adhesive composition of this invention. Such additives include waxes, plasticizers, extending oils, fillers, pigments, flow modifiers, dyestuffs, etc., which may be incorporated in minor or larger amounts into the adhesive formulation, depending on the purpose. Typical concentrations of plasticizer and wax in the diluent are 10–70% and up to 30% by weight respectively.

These hot melt adhesives may be prepared using techniques known in the art. Typically, the adhesive compositions are prepared by blending the components in the melt at a temperature of about 100°–200° C. until a homogeneous blend is obtained, approximately two hours. Various methods of blending are known and any method that produces a homogeneous blend is satisfactory. In blending the starch with other components of the hot melt composition, it may be desirable to precondition or preswell the starch with diluent (a portion, i.e., 10% or more, or all of the diluent used in the formulation by weight) or water, preferably with both, either at room temperature or slightly elevated temperature (typically $\leq 100°$ C.) and preferably in a sealed container. The added moisture (usually $\leq 35\%$ by weight based on the weight of the starch) promotes swelling of the starch and thus serves as a processing aid. Moisture can be added directly to the starch as liquid water or by conditioning the starch at high humidity. Essentially all of the water is removed by evaporation (to $<2\%$ by weight of the final composition) in the final mixing of the adhesive formulation. Preswelling of the starch promotes the rapid formation of a homogeneous melt at reduced temperatures and has been found particularly useful when the starch has a low degree of substitution, such as a DS of less than 2.

The resulting adhesives are characterized in that they have a viscosity of 50,000 cPs or less at the application temperature of 400° F. (204° C.) or less. The viscosity as used herein is a Brookfield viscosity measured using a Brookfield viscometer model No. DV-II with spindle no. 27 at 10 rpm.

As noted previously, an important characteristic of a hot melt adhesive composition is that it does not need or require any solvent or volatile material such as water. The hot melt adhesive composition of this invention also does not need or require water. However, because of the somewhat hydrophilic nature of the material, there may be some pick up or absorption of moisture in the system after completion of blending, mixing and formulating and during storage. Since water is not necessary and should be avoided because it can cause foaming, steaming and weakening of the adhesive joint, it is preferred that the composition be substantially free of water. More particularly, the adhesive composition preferably will contain less than about 2% and more preferably less than about 1% moisture by weight in the final composition, i.e., directly after blending or formulating or upon application of the adhesive at the application temperature.

Other advantageous characteristics of the hot melt adhesive of this invention include: moisture content of less than about 20% by weight, preferably less than about 15% at 90% relative humidity (RH) and 23° C. (i.e., the substantially dry adhesive will equilibrate to a moisture content under these conditions by absorbing or picking up moisture); tensile strength of greater than about 35 psi, preferably greater than about 50 psi at 50% RH and 23° C. and a testing speed of ≦4,000%/minute; elongation of greater than about 10% and preferably greater than about 100% at 50% RH and 23° C. at a testing speed of ≧100%/minute; adhesion at 90% RH and 23° C. as shown by fiber tear (procedure described in Example V) and shear failure at greater than about 120° F. (procedure described in Example V). These adhesive compositions are particularly able to satisfy the noted properties because of their low moisture absorption characteristics.

In carrying out the tensile strength and elongation tests as noted above, the following procedures were followed. Appropriate testing configuration will depend on the nature of the adhesive. When soft adhesives are tested, tensile bars are prepared by pouring molten adhesive into silicone rubber molds (2.5" long, 0.125" deep and 1" wide except for the central gage section which is 0.5" wide and 0.5" long). The formed bars were pulled at 20"/min. Harder samples may fail at the gage/grip interface of the above specimen configuration and for these materials ASTM D638 describes a number of suitable specimen shapes. In addition, the use an extensometer is required in the test procedure of ASTM D638.

The adhesives disclosed herein may be employed in a wide variety of uses as known in the art. The high degree of biodegradability imparted to these systems through the use of starch based materials makes them particularly useful in environmentally sensitive areas such as in composting applications. Additionally, the water dispersibility of these materials makes them useful in applications requiring the recycling of paper products. Typically these applications include case and carton sealing, industrial bag sealing, non-woven or disposable diapers, bottle labeling, and bookbinding or padding uses involving the use of hot melt adhesive compositions. These compositions all contain the modified starch ester, as described herein, as well as a non-volatile, polar organic diluent which further may comprise an effective amount of plasticizer and wax material. These compositions may additionally contain a compatible polymer material as well as a tackifier and antioxidant.

The following examples will further illustrate the embodiments of this invention. In these examples all parts are given by weight and all temperatures in degrees Celsius unless otherwise noted.

EXAMPLE I

Modified, intermediate DS (0.3–1.8), starch esters, e.g., starch propionate to be formulated into a hot melt adhesive were prepared in the following manner.

A lab scale reactor was constructed from a five gallon plastic bucket and a cooling coil fabricated from five meters of ¼ inch copper tubing and coiled to fit into the bucket with a one inch wall clearance. Cold water was pumped through the coil as needed to keep the reaction media at the prescribed temperature. An overhead motor was equipped with a two inch propeller type stirrer at the end of the stirrer shaft and a two inch turbine about six inches above the propeller. Plastic inlet tubes with a two mm inside diameter were placed ½ inch above opposing corners of the propeller blade. One inlet was connected to the reagent pump while the other feeding 25% sodium hydroxide was connected to the caustic pump with each being at least one inch below the starting water level to insure adequate mixing.

The reactor was charged with five liters of water and 2.5 kilograms of starch. Once a uniform slurry was obtained, the pH of the reactor mix was adjusted to 8.0 by initiating the caustic pump and pH controller (pH can be controlled manually if desired). The temperature was lowered to 10°–15° C. by adjusting the flow of cooling water. Once the proper temperature was reached, the flow of anhydride was started. The anhydride pump was calibrated to deliver the total charge in four hours. The pH control pump was set to automatic and the flow of cooling water increased to account for the exothermic reaction.

The reaction was complete when all the anhydride had been added, the pH stabilized and the consumption of caustic stopped. At this point the pH of the reaction was adjusted to 6.0 with HCl. The starch was filtered and residual material removed by washing the filter cake with about three additional five liter volumes of water. The final product was air dried to less than 15 percent moisture before being packaged.

Various starch esters using different starch base material, different esters and having a range of intermediate DS were prepared in this manner and used in the subsequent examples.

EXAMPLE II

Several different starch esters prepared as in Example I were formulated into meltable screening compositions and tested as follows. The starch was dried at 100° C. overnight, then 42 grams of dry starch was mixed by hand with 18 grams of glycerin in a plastic jar. The premix was then added to a 60 gram Brabender mixing bowl, preheated to 130° C. and containing roller-style blades, rotating at 30–35 rpm. The torque on the blades was recorded and then the temperature raised to 150° C. The steady state torque at each temperature is displayed in Table 1.

TABLE 1

| SAMPLE NO. | STARCH | TORQUE (m-g) | |
|---|---|---|---|
| | | 130° C. | 150° C. |
| 1 | Hylon ® VII Propionate Starch (DS = 0.94)[1] | 1800 | 950 |
| 2 | Hylon VII Starch (Acid Hydrolyzed) Propionate (DS = 0.8) | 1730 | 920 |
| 3 | Nadex ® 360 Propionate Dextrin (DS = 0.7)[1] | 350 | 100 |
| 4 | EK Hylon VII Starch | 4900 | 3700 |
| 5 | Nadex 360 Dextrin | 500 | 230 |

[1]Hylon and Nadex are commercially available products of National Starch and Chemical Company These examples show the reduction of viscosity for the different compositions when using a modified starch ester. Hylon VII is a high amylose corn starch having about 70% amylose content and a DE of approximately 0 and Nadex 360 is a dextrinized (white dextrin) corn starch having a DE of about 0.5 to 2.5. The use of Hylon VII propionate starch in Sample 1 and a fluidity grade, acid hydrolyzed, Hylon VII starch (DE of less than about 1.7) in Sample 2 showed a significant viscosity reduction over the straight EK Hylon VII starch of Sample 4 (EK processing involved pregelatinization by sequential jet cooking and spray drying). Likewise a dextrinized starch, Nadex 360 of Sample 5, had a higher viscosity than the modified ester of Nadex 360 propionate dextrin of Sample 3.

EXAMPLE III

Three component adhesive formulations were prepared from starch, glycerin and polyvinyl alcohol (PVOH) in equal proportions. The PVOH was a low viscosity grade hydrolyzed to 45-51% and was obtained from Nippon Gohsei under the designation LL02. Eighty-seven (87) grams of starch were added to 87 grams of glycerin and blended by hand in a polyethylene beaker. The premix was then added to a Brabender Prep Mixer with roller-style blades, preheated to 130° C. and 87 grams of PVOH added to the melt.

As shown in Table 2, propionated Hylon VII starch (DS=0.94), Sample 6, provided a homogeneous mix but with an excessively high viscosity (using Brookfield viscometer with a #27 spindle at 10 rpm) at the projected application temperature of about 135° C.

The propionated dextrin, Nadex 360 propionate, provided a homogeneous mix with a much lower viscosity, Sample 7, than the non-propionated dextrin of Sample 8.

TABLE 2

| SAMPLE NO. | STARCH | APPEARANCE | VISCOSITY (cP) 135° C. | 150° C. |
|---|---|---|---|---|
| 6 | Hylon VII Propionate Starch (DS = 0.94) | Hazy, tacky, rubbery, tough | >500,000 | |
| 7 | Nadex 360, Propionate Dextrin (DS = 0.8) | Hazy, tacky, soft | 58,000 | 31,000 |
| 8 | Nadex 360 Dextrin | Grainy, hard | >500,000 | 200,000 |

EXAMPLE IV

This example illustrates a three component hot melt comprising starch propionate, glycerin and ethylene/vinyl alcohol copolymer.

Nadex 360 propionate dextrin (DS=0.8) was held in a humidity cabinet at 90° F. and 90% RH (relative humidity) overnight. Twenty-five (25) parts of this high moisture starch was combined with 25 parts of glycerin and the mixture held at 70° C. overnight in a sealed plastic jar yielding a hard cake.

To a Brabender mixing bowl, preheated to 160° C. and containing roller-style blades, was added 25 parts of BX 228, an ethylene/vinyl alcohol copolymer obtained from DuPont containing 44 mole percent ethylene units and with a dry melting point of 167° C. and a heat of fusion of 70 J/g (by differential scanning colorimetry-DSC). The BX 228 was exposed to 90° F. and 90% RH overnight to depress the melting point. Once a homogeneous melt was formed, 25 parts of glycerin was slowly added and the temperature reduced to 130° C. to prevent rapid thermal degradation of the starch when added. The starch/glycerin cake previously prepared was broken up and added to the mixing bowl forming a clear homogeneous three-component melt.

The collected product had a viscosity of 90,000 cps at 135° C. and 54,000 cps at 150° C. and exhibited a melting point of 123° C. and a heat of fusion of 19.3 J/g. The suppressed melting point (by 44° C.) is highly desirable as it permits the formulated adhesive to be applied at temperatures at which the starch component has adequate stability (<135° C.).

EXAMPLE V

Several different starch esters were prepared and formulated into adhesive compositions using either Pycal 94, an ethoxylated phenol from ICI Americas, or Macol 206E, an ethoxylated Bisphenol A obtained from PPG/Mazer, and Paracin 220, N-(2-hydroxyethyl)-12-hydroxystearamide, a wax obtained from Cas Chem as diluents. The base starch materials, i.e., Hylon VII starch and Nadex 360 dextrin were described in the previous examples while Hylon VIII starch is a high amylose corn starch having about 85% by weight amylose content and a DE of approximately 0. The acid hydrolyzed starches of Samples 11 and 16 have DE's of less than about 1.7. Test results are shown in Table 3.

Each sample was mixed in a Brabender mixer with sigma style blades. In Samples 5, 11 and 16, liquid water was added in sufficient quantities prior to mixing so that the total amount of water was 25 parts per hundred parts of dry starch. In Sample 12 the starch was preconditioned at 90° F./90% RH overnight (typically absorbs about 16% moisture). The remaining samples were dried at 110° C. for two hours prior to mixing with the plasticizer (Samples 9, 10, 13-15). It has been found that moisture is not necessary as a processing aid with high DS (>1.5) starch esters. The lower the DS the more helpful moisture is in promoting the dissolution of the starch into the plasticizer. All samples were held at 70°-80° C. overnight in a sealed jar after the starch was combined with the plasticizer and any added moisture.

Viscosities were measured on a Brookfield viscometer model no. DV-II, at 10 rpm using Spindle 27. The viscosity was measured both as-received and after 24 hours at 275° F. in a glass jar covered with aluminum foil.

Adhesion to kraft paper was tested in the following manner. A molten bead of hot melt at 250° to 275° F. was drawn across the middle (widthwise) of a 1"×3" strip of kraft paper. A second strip of kraft paper was then immediately superimposed upon the first and a 200 gram weight placed on top of the construction. The kraft to kraft bonds were tested at 0° F. and 40° F. after ageing or conditioning overnight and at 72° F./50% RH after conditioning for one week. The samples were stressed by hand at the temperature of storage in a 90° peel mode and a determination made as to the type of failure, fiber tearing (FT) and non-fiber tearing (NFT) bonds were noted.

The adhesive was also subjected to peel/shear testing such as is conventionally required in the packaging industry. In the peel temperature test a bead of test adhesive approximately ⅛ inch in diameter was applied at 250° to 275° F. with a glass rod onto 60 pound/ream kraft paper. A second sheet of the same paper was superimposed on the first sheet within two seconds and pressed thereto to from a kraft to kraft bond. The bonded sheets were then cut perpendicular to the adhesive line into one inch wide strips. Duplicate bonded specimens were placed in an oven with one free end of the specimen attached to a fixed support and a 100 gram load suspended from the other sheet at the same end of the bond. The oven temperature was then increased from room temperature in 10° F. increments at 20 minute intervals. The temperature at which bond delamination occurred was specified as the peel temperature.

In the shear temperature test, samples were prepared as in the peel temperature test, but separate sheets of kraft paper, at opposite ends of the bonded specimen were suspended and weighted to stress the bond in a shear mode. The temperature of the oven was increased as in the peel test until failure occurred.

All of the starch esters formed melts and those tested had good adhesion properties as shown in Table 3.

EXAMPLE VI

The following samples, A, B, C and D containing the starch esters in different hot melt formulations were tested for different properties, as shown in the following table, to demonstrate their utility for different applications.

TABLE 3

| Sample | 9 | 10 | 11 | 12 |
|---|---|---|---|---|
| Starch | Hylon VII Acetate Starch | Hylon VII Propionate Starch | Hylon VII (Acid Hydrolyzed), Propionate Starch | Nadex 360 Propionate Starch |
| DS | 2.35 | 2.3 | 1.0 | 0.9 |
| Parts | 25 | 25 | 40 | 50 |
| Temperature (°C.) | 130 | 130 | 130 | 135 |
| Moisture | dried 110° C., 2 hrs. | dried 110° C., 2 hrs. | 25/100 (Water/Starch) | humidified (90° F./90% RH) |
| Diluent | Macol 206E/ Paracin 220 | Macol 206E/ Paracin 220 | Macol 206E/ Paracin 220 | Pycal 94/ Paracin 220 |
| Parts | 58/17 | 58/17 | 50/10 | 25/15 |
| PVOH (LL02) parts | — | — | — | 10 |
| Comments | Clear melt no exudation cold | Smooth, cloudy melt no exudation cold | Slightly hazy melt, no exudation cold | Smooth hazy melt no exudation cold |
| Viscosity (cP) at 275° F. | | | | |
| Initial | 4200 | 454,000 | 5400 | 3700 |
| After 24 Hours | 1800 | 236,000 | 4200 | — |
| Adhesion kraft/kraft | | | | |
| 0° F. | NFT | FT | FT | FT |
| 40° F. | FT | FT | FT | FT |
| 72° F., 50% RH | FT | FT | FT | FT |
| Peel Failure T (°F.) | 120 | 90 | 100 | 100 |
| Shear Failure T (°F.) | 190 | 200 | 180 | 194 |

| Sample | 13 | 14 | 15 | 16 |
|---|---|---|---|---|
| Starch | Hylon VII Propionate Starch | Hylon VII Propionate Starch | Hylon VIII Acetate Starch | Hylon VII (Acid Hydrolyzed), Acetate/Propionate Starch |
| DS | 2.55 | 2.04 | 2.69 | 1.1 |
| Parts | 25 | 25 | 25 | 40 |
| Temperature (°C.) | 130 | 130 | 130 | 130 |
| Moisture | dried 110° C., 2 hrs. | dried 110° C., 2 hrs. | dried 110° C., 2 hrs. | 25/100 (Water/Starch) |
| Diluent | Macol 206E/ Paracin 220 | Macol 206E/ Paracin 220 | Macol 206E/ Paracin 220 | Macol 206E/ Paracin 220 |
| Parts | 58/17 | 58/17 | 58/17 | 50/15 |
| PVOH (LL02) parts | — | — | — | — |
| Comments | Smooth cloudy melt no exudation cold | Smooth, slight cloudy melt no exudation cold | Smooth, clear melt no exudation cold | Smooth, hazy tan melt, no exudation cold |
| Viscosity (cP) at 275° F. | | | | |
| Initial | | 56,300 | 16,500 | |
| After 24 Hours | | 32,200 | 8,500 | |
| Adhesion kraft/kraft | | | | |
| 0° F. | | FT | FT | |
| 40° F. | | FT | FT | |
| 72° F., 50% RH | | FT | FT | |
| Peel Failure T (°F.) | | 90 | 95 | |
| Shear Failure T (°F.) | | 190 | 200 | |

TABLE 4

| | Sample No. | | | |
|---|---|---|---|---|
| Starch | A Nadex 360 Propionate Dextrin | B Nadex 360 Propionate Dextrin | C Hylon VII (Acid Hydrolyzed), Propionate Starch | D Hylon VII (Acid Hydrolyzed), Propionate Starch |
| DS | 0.9 | 0.8 | 1.25 | 1.25 |
| Parts | 50 | 50 | 50 | 45 |
| Diluent | Pycal 94/ Paracin 220 | Carbowax 200/ Paracin 220 | Marcol 206E/ Paracin 220 | Marcol 206E/ Paracin 220 |
| Parts | 25/15 | 25/15 | 35/15 | 35/10 |
| PVOH (LL02) parts | 10 | 10 | — | — |
| Foral AX (wood rosin) parts | — | — | 0 | 10 |

TABLE 4-continued

| Starch | A<br>Nadex 360<br>Propionate Dextrin | B<br>Nadex 360<br>Propionate Dextrin | C<br>Hylon VII<br>(Acid Hydrolyzed),<br>Propionate Starch | D<br>Hylon VII<br>(Acid Hydrolyzed),<br>Propionate Starch |
|---|---|---|---|---|
| Phosphite (antioxidant) parts | — | — | 0.5 | 0.5 |
| Hydroquinone (anti-oxidant) parts | — | — | 0.5<br>0.5 | 0.5<br>0.5 |
| Viscosity (cP) | | | | |
| at 250° F. | 7225 | 5675 | 9850 | 5750 |
| at 275° F. | 3700 | 2605 | — | — |
| Adhesion (corrugated) | | | | |
| RT/50% RH | Fiber tear | Fiber tear | Fiber tear | Fiber tear |
| RT/81% RH | Fiber tear | Fiber tear | Fiber tear | Fiber tear |
| 40° F. | Fiber tear | Fiber tear | Fiber tear | Fiber tear |
| 0° F. | Fiber tear | Fiber tear | Fiber tear | Fiber tear |
| Peel Failure T (°F.) | 100 | 150 | 150 | 120 |
| Shear Failure T (°F.) | adj 200 | adj 200 | 190 | 160 |
| Ring & Ball (softening pt. °F.) | 199 | — | 205 | 192 |
| Thermal Stability (24 hrs/250° F.) | | | | |
| color | — | — | light brown | light brown |
| skin | No | No | No | No |
| gel | No | No | No | No |
| Final Viscosity cP (250° F.) | 1680 | 1700 | 14750 | 6400 |
| Water Dispersibility (Tappi UM 666 10/min/160° F.) | 35.4% | 93.6% | — | — |

These results show that A and B are suitable for packaging applications such as case and carton sealings, B is preferred due to its high heat resistance (peel). Additionally, B has a much higher dispersibility in warm water which makes it an ideal candidate for applications requiring repulpable adhesives. C and D are suitable for applications requiring good paper adhesion. C is preferred for industrial bag applications due to its higher resistance (peel) and D demonstrates the utility of tackifying resins in the formulation. Formulations A through D exhibit adequate thermal stability for use as commercial hot melt adhesives due to the absence of skin and gel formation.

EXAMPLE VII

This example illustrates the use of modified starch esters and formulations thereof in non-woven and disposable diaper applications.

Non-woven to non-woven and non-woven to polyethylene film bonds were prepared using the formulations A and B, shown in Table 5 and tested in the following manner with the results also shown in Table 5. A six inch molten bead of hot melt composition was applied down the center of a substrate (2"×6") at 275°–300° F. after which a second substrate was mated to the first. The open time was 0–2 seconds. After conditioning for 48 hours at 20° C./50% RH the bonds were tested in an Instron tensile tester at 20 inches/minute head speed in a peel mode. The composition and test results are given in Table 5.

TABLE 5

| Starch | A<br>Nadex 360<br>Propionate Dextrin | B<br>Nadex 360<br>Propionate Dextrin |
|---|---|---|
| DS | 0.8 | 0.8 |
| Parts | 60 | 55 |
| Diluent | Macol 206E/ | Macol 206E/ |
| Parts | Paracin 220<br>35/5 | Paracin 220<br>40/5 |
| Hindered phenol (antioxidant) | 0.5 | 0.5 |
| Phosphite (antioxidant) | 0.5 | 0.5 |
| Viscosity (cP) | | |
| at 300° F. | 6250 | 3474 |
| at 250° F. | 28100 | 9500 |
| Adhesion (g/lin. inch) non-woven/non-woven (20 inch/min) | 36 | 52 |
| Polyethylene film/pp non-woven (20 inch/min) | 19 | 36 |
| Thermal Stability (72 hrs/250° F.) | | |
| color | light brown | light brown |
| skin | none | none |
| gel | none | none |

The results shown in Table 5 demonstrate that the modified starch esters as formulated, exhibit relatively low viscosity, good thermal stability and adhesion to non-woven and film substrates typically used in the disposable diaper industry and therefore show them useful in such applications.

EXAMPLE VIII

This example as shown in the following table illustrates the properties of several low DS starches outside the composition of this invention, i.e., DS below about 0.3. The base starch material was an acid hydrolyzed high amylose corn starch (Hylon VII) having an amylose content of about 70% and a DE of about 1.7.

TABLE 6

| Starch | Sample No. | | |
|---|---|---|---|
| | A<br>Hylon VII | B<br>Hylon VII<br>Acetate | C<br>Hylon VII<br>Propionate |
| DS | 0 | 0.23 | 0.17 |
| Parts Starch | 40 | 40 | 40 |
| Diluent | Macol 206E/Paracin 220 | Macol 206E/Paracin 220 | Macol 206E/Paracin 220 |
| Parts | 40/10 | 40/10 | 40/10 |
| Initial Water, Parts | 10 | 10 | 10 |
| Appearance As Prepared | Weak, pasty | Weak, stiff goo | Weak, stiff goo |
| Viscosity 275° F. (cP) | —¹ | 75 | 80 |
| Adhesion kraft/kraft | | | |
| 0° F. | —² | NFT³ | NFT |
| 23° C., 50% RH | —² | NFT | NFT |
| 23° C., 90% RH | —² | NFT | NFT |
| Thermal Stability<br>(24 hrs. at 275° F.) | Top ⅓ is clear liquid, bottom is stiff opaque starch cake | Top ⅓ is clear liquid, bottom is stiff opaque starch cake | Top ⅓ is clear liquid, bottom is stiff opaque starch cake |

¹Phase separation quickly/no viscosity measured
²Phase separation
³NFT - non fiber tearing The low DS starches as shown in Table 6 did not dissolve and/or swell in the formulation and thus settled on standing at the application temperature which is unacceptable. In addition when applied to paper they exhibited no adhesion (non fiber tearing).

What is claimed is:

1. A hot melt adhesive composition comprising from about 10 to 80% by weight of a starch ester having from about 2 to 18 carbon atoms in the ester component and a degree of substitution (DS) of from about 0.3 to 3.0, and a diluent which is a non-volatile, polar organic material that is compatible with the starch ester and is present in sufficient amount to allow the composition to melt at an application temperature of 400° F. or less and have a viscosity of 50,000 cPs or less at that temperature.

2. The composition of claim 1 wherein the starch ester has a DS of from about 0.7 to 2.4.

3. The composition of claim 2 wherein the starch ester contains 2 to 7 carbon atoms in the ester component.

4. The composition of claim 1 wherein the adhesive composition contains from about 20 to 90% by weight of the diluent, from about 0 to 35% by weight of a compatible hydrophilic or hydrophobic thermoplastic polymer, from about 0 to 70% by weight of a tackifier and from about 0 to 3% by weight of an antioxidant.

5. The composition of claim 4 wherein the starch ester has the formula:

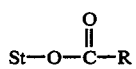

where St is the starch base material and R is an alkyl, aryl, alkenyl, alkaryl or aralkyl containing 1 to 17 carbon atoms.

6. The composition of claim 5 wherein the starch ester has a DS of from about 0.7 to 2.4.

7. The composition of claim 6 wherein the starch ester contains an R group which is an alkyl group of 1 to 6 carbon atoms.

8. The composition of claim 5 wherein the starch ester has a DS of from about 0.8 to 1.5.

9. The composition of claim 8 wherein the starch ester contains an R group which is an alkyl group of 1 to 6 carbon atoms.

10. The composition of claim 5 wherein the diluent contains a sulfonamide, alcohol, amide or ester group.

11. The composition of claim 5 wherein the diluent contains an alcohol group and absorbs low levels of moisture at high humidity.

12. The composition of claim 5 which contains less than about 2% by weight of moisture in the final composition.

13. The composition of claim 10 wherein the starch base material is high amylose starch having at least 65% by weight amylose content.

14. The composition of claim 10 wherein the starch base material is waxy maize.

15. The composition of claim 13 wherein the starch ester is an acetate, a propionate or a mixture thereof, or a starch containing both acetate and propionate groups.

16. The composition of claim 10 wherein the polymer contains a hydroxyl polar group.

17. The composition of claim 10 wherein the polymer is polyvinyl alcohol, ethylene/vinyl alcohol or hydroxypropyl cellulose.

18. The composition of claim 10 wherein the tackifier is a polar tackifier having a Ring and Ball softening point, as described by ASTM E-26, of greater than 60° C.

19. The composition of claim 5 wherein the starch is preswelled with a portion or all of the diluent used in the composition, or up to 35% by weight moisture based on the weight of starch, or a combination thereof, at a temperature of up to about 100° C.

20. The composition of claim 5 wherein the starch base material is high amylose starch having at least 65% by weight amylose content.

21. The composition of claim 5 wherein the starch ester is present in an amount of from about 20 to about 60% by weight.

22. The composition of claim 21 wherein the starch ester has a DS of from about 0.7 to 2.4.

23. The composition of claim 22 wherein the starch ester contains an R group which is an alkyl group of 1 to 6 carbon atoms.

24. The composition of claim 23 wherein the diluent is present in an amount of from about 25 to 75% by weight.

25. The composition of claim 24 wherein the starch ester has a DS of from about 0.8 to 1.5.

26. The composition of claim 19 wherein the R group of the starch ester has 1 to 6 carbon atoms.

27. The composition of claim 26 wherein the starch ester has a DS of from about 0.3 to 2.0.

28. The composition of claim 27 wherein the diluent is present in an amount of from about 25 to 75% by weight.

29. The composition of claim 28 wherein the starch ester is an acetate, a propionate or a mixture thereof, or a starch containing both acetate and propionate groups.

30. A case and carton sealing hot melt adhesive composition comprising the composition of claim 5 wherein the starch ester contains an R group which is an alkyl of 1 to 6 carbon atoms and wherein the diluent further comprises from about 10 to 60% by weight of a plasticizer and from about 5 to 30% by weight of a wax material.

31. The composition of claim 30 wherein the adhesive has suitable water dispersibility making it useful for case and carton sealing applications requiring the use of a repulpable adhesive.

32. The composition of claim 30 which is biodegradable and is useful in composting applications.

33. An industrial bag sealing hot melt adhesive composition comprising the composition of claim 5 wherein the starch ester component contains an R group which is an alkyl group of 1 to 6 carbon atoms and wherein the diluent further comprises from about 10 to 60% by weight of a plasticizer and from about 5 to 30% by weight of a wax material.

34. A non-woven or disposable diaper hot melt adhesive composition comprising the composition of claim 5 wherein the starch ester contains an R group which is an alkyl group of 1 to 6 carbon atoms and wherein the diluent further comprises from about 10 to 70% by weight of a plasticizer and from about 0 to 15% by weight of a wax material.

35. A bottle labelling hot melt adhesive composition comprising the composition of claim 5 wherein the starch ester contains an R group which is an alkyl group of 1 to 6 carbon atoms and wherein the diluent further comprises from about 10 to 80% by weight of a plasticizer and from about 0 to 30% by weight of a wax material.

36. A bookbinding or padding adhesive composition comprising the composition of claim 5 wherein the starch ester contains an R group which is an alkyl group of 1 to 6 carbon atoms and wherein the diluent further comprises from about 10 to 70% by weight of a plasticizer and from about 0 to 35% of a wax material.

* * * * *